United States Patent [19]

Giesfeldt et al.

[11] Patent Number: 5,073,201

[45] Date of Patent: * Dec. 17, 1991

[54] PROCESS FOR PRODUCING A HIGH TOTAL DIETARY CORN FIBER

[76] Inventors: J. E. Todd Giesfeldt, 414 S. 8th Ave., La Grange, Ill. 60525; Robert J. Repta, 7722 W. Cashew, Orland Park, Ill. 60462; Irving F. Deaton, 8610 240th SW #36, Edmonds, Wash. 98020

[*] Notice: The portion of the term of this patent subsequent to Feb. 19, 2008 has been disclaimed.

[21] Appl. No.: 518,723

[22] Filed: May 3, 1990

Related U.S. Application Data

[63] Continuation-in-part of Ser. No. 211,188, Jun. 23, 1988, Pat. No. 4,994,115.

[51] Int. Cl.⁵ ............................................. C08B 30/00
[52] U.S. Cl. ............................................. 127/67; 127/69
[58] Field of Search ................................ 127/67, 69

[56] References Cited

U.S. PATENT DOCUMENTS

| | | | |
|---|---|---|---|
| 2,772,990 | 12/1956 | Hage | 127/67 |
| 2,913,112 | 11/1959 | Stavenger et al. | 209/211 |
| 3,029,169 | 4/1962 | Dowie | 127/67 |
| 3,813,298 | 5/1974 | Chwalek | 127/69 |
| 4,144,087 | 3/1979 | Chwalek et al. | 127/24 |
| 4,181,534 | 1/1980 | Headley | 127/67 |
| 4,181,747 | 1/1980 | Kickle et al. | 426/615 |
| 4,207,118 | 6/1980 | Bonnyay | 127/24 |
| 4,244,748 | 1/1981 | Chwalek et al. | 127/67 |
| 4,565,702 | 1/1986 | Morley et al. | 426/93 |
| 4,757,948 | 7/1988 | Nonaka et al. | 241/7 |
| 4,994,115 | 2/1991 | Giesfeldt et al. | 127/67 |

FOREIGN PATENT DOCUMENTS 0166824 1/1986 European Pat. Off.
0194060 9/1986 European Pat. Off.

OTHER PUBLICATIONS

Vetter, James L., "Fiber as a Food Ingredient", 156 *Food Technology* (1984).
Whistler, Roy L., "Starch: Chemistry & Technology", *Academic Press* (1967).
Food Composition and Food and Drink, *Japanese Abstract*, vol. 12, No. 372 (C-533), Oct. 5, 1988.

*Primary Examiner*—Theodore Morris
*Assistant Examiner*—P. L. Hailey
*Attorney, Agent, or Firm*—Brooks Haidt Haffner & Delahunty

[57] ABSTRACT

An improved process is disclosed for producing corn fiber having a high total dietary fiber content and a reduced $SO_2$ content. A dilute aqueous slurry of the corn fiber obtained from the corn wet-milling process is separated by means of a hydroclone to give a fiber fraction of enhanced total dietary fiber content. This fiber fraction is then passed into a first centrifugal paddle screen followed by two stages of washing, including washing with a second centrifugal paddle screen. Fiber from the second centrifugal paddle screen, which is optionally pressed to remove water that contains dissolved $SO_2$, is dried to make the final product. Heated water can be used during washing to remove additional $SO_2$ more effectively.

22 Claims, No Drawings

PROCESS FOR PRODUCING A HIGH TOTAL DIETARY CORN FIBER

CROSS-REFERENCE TO RELATED APPLICATIONS

This is a continuation-in-part of application Ser. No 211,188, filed June 23, 1988. and issued as U.S. Pat. No. 4,994,115 on Feb. 19, 1991.

BACKGROUND OF THE INVENTION

1. Field of the Invention

This invention relates to a method of processing the mixed fiber stream obtained from the corn wet-milling process to make a product having a high total dietary fiber content.

2. Description of Related Art

In recent years, there has been an increasing awareness of the role that fiber plays in the human diet. This stems not only from the role that fiber plays as a bulking agent, but also from the role it is believed to play in preventing diseases of the gastrointestinal tract.

The dietary fiber from wheat, wheat bran, has been consumed in breakfast cereals, whole wheat breads, and similar products for many years. However, there is a recognized need for larger amounts of fiber to supplement processed foods which are now consumed by a large proportion of the population. For these reasons, food suppliers have sought additional sources of dietary fiber.

One potential source of dietary fiber is the corn fiber obtained as a by-product of the wet milling of corn. However, this product contains fairly high percentages of starch and protein. Such additional components make the fiber less suitable for use in baking and other food applications. This has led workers to look for an economical and commercially acceptable process to reduce the amount of starch and protein while increasing the dietary fiber content of the fiber obtained from the corn wet-milling process.

In U.S. Pat. No. 4,181,534, a process is disclosed for treating the wet fiber stream obtained from the corn wet-milling process. According to the process, the fiber stream, while still wet, is abraded by means of a beater or impact mill. The milled product is then separated into fractions with one fraction being an enriched fiber containing a high proportion of pentosans.

A process for enriching the fiber obtained from corn and soybeans is disclosed in U.S. Pat. No. 4,181,747. In this process, the crude fiber is heated with dilute aqueous acid to hydrolyze and dissolve undesired by-products. The material is then washed extensively in order to obtain a fiber of higher dietary fiber content.

U.S. Pat. No. 4,757,948 discloses a process for producing a high total dietary corn fiber by a two-step process which employs first a sifter and then a roller mill. The fiber fraction obtained in accordance with this process has from about eighty to eighty-five percent total dietary fiber.

Although these prior processes can give an enriched fiber product, there is still a need for a simple low-cost process for commercially producing a product of high dietary fiber content from corn. We have now discovered a simple and economical process for enriching the dietary fiber content of corn fiber without the need for a chemical hydrolysis or for an expensive milling operation. By this process, the corn wet-miller can convert in a continuous, high-yield process a low-value by-product to a food component of much higher value. Moreover, with further process refinements, the dietary fiber can be produced with a very low sulfur dioxide ($SO_2$) content.

SUMMARY OF THE INVENTION

In accordance with this invention, there is provided a process for producing a corn fiber product having a high dietary fiber content which comprises:

(a) diluting crude fiber obtained from the corn wet-milling process with water to give an aqueous slurry of crude corn fiber with a solids concentration of from about 2% to about 5% by weight;

(b) passing said aqueous slurry of crude corn fiber through a hydroclone with the operating pressure of said hydroclone being adjusted to optimize the recovery of fiber in the overflow stream from the hydroclone while causing undesired starch and protein components to exit the hydroclone in the underflow steam; (c) passing said overflow stream from the hydroclone into a first centrifugal paddle screen having (1) screen openings which are sized to maximize the amount of starch and protein which pass through the screen while maintaining a high yield of fiber, and (2) a clearance (also called a gap) between the screen and the paddles which is selected to optimize scrubbing the fiber to remove starch and protein while maintaining a reasonable yield;

washing the solid separated by the first centrifugal paddle screen; and (e) passing the washed solid into a second centrifugal paddle screen wherein the screen openings and clearance between the screen and the paddles are optimized on the basis of the same criteria as those used in the first centrifugal paddle screen.

The washing step can be conducted in a continuous or batchwise fashion. Heated water can be used optionally in the washing step to facilitate $SO_2$ removal. Wash water can also be treated to reduce $SO_2$ content prior to washing, and/or following washing for recycle purposes. This treatment can be conducted, for example, with a steam stripper to boil the wash water and thereby remove $SO_2$.

When the product is removed from the second centrifugal paddle screen, an optional pressing step can be used to remove water. This step also reduces $SO_2$ content in the product.

DESCRIPTION OF THE PREFERRED EMBODIMENTS

In the corn wet-milling process, corn kernels are first softened by soaking them in water containing $SO_2$. This is referred to as the steeping process. After steeping the corn kernels, they are coarsely ground with water in order to free the germ (the oil-containing portion of the kernel). The germ is separated from the other solid components of the corn kernel by passing the resulting slurry into a hydroclone. The underflow from the hydroclone, which contains starch, protein and fiber is then ground in an impact-type mill followed by screening to separate crude mixed fiber from the finer particles of starch and protein. This crude mixed fiber is the starting material used in the process of this invention. It is a readily available raw material produced in large quantities by the corn wet-milling industry. For a more detailed discussion of the industrial corn wet-milling process, see *Starch Chemistry and Technology*, Whistler and Paschall, Editors, Vol. II, Chapter 1, pp. 1-51, Academic Press, N.Y. (1967).

In accordance with the present invention, the crude mixed fiber stream, having a moisture content of from about 80% to about 90% by weight, is diluted with water to form a slurry having a solids content of from about 2% to about 5% by weight. The water used at this stage can be fresh water or recycled process water. This aqueous slurry is then passed through a hydroclone.

Suitable hydroclones for use in the process of this invention are well-known items of commerce. Hydroclones of various sizes and designs can be used as will be apparent to those skilled in the art. A particularly suitable hydroclone is one available from the Dorr-Oliver Company, Stamford, Connecticut, which has a diameter of about 6 inches at the top of its 3-foot length. This hydroclone is described in detail in U.S. Pat. No. 2,913,112. It has been used for many years in the corn wet-milling industry for the aqueous separation of germ from corn, and its structure is described in detail in the chapter from *Starch Chemistry and Technology* cited above. As noted in that article, batteries of the hydroclones may be operated in parallel when it is desired to separate large volumes of material.

In the process of this invention, the pressure drop across the hydroclone is adjusted to maximize recovery of fiber in the overflow stream from the hydroclone while causing undesired starch and protein components to exit the hydroclone in the underflow stream. The pressure drop is preferably adjusted so that from about 65% to about 75% of the volume of the aqueous slurry entering the hydroclone exits in the overflow stream of the hydroclone. Under these preferred conditions, the pressure drop across the hydroclone is usually between about 8 and 12 psi (0.56–0.9 kg/cm$^2$). The underflow, which contains a larger concentration of starch and protein along with some fiber, is returned to the corn wet-milling process where it is combined with the normal by-products of the process.

The overflow stream from the hydroclone contains coarse solid material which has a much higher dietary fiber content than does the material which passes in the underflow stream of the hydroclone. This overflow stream is passed into a first centrifugal paddle screen where the coarse solid material is further purified to give an intermediate product having about 90% total dietary fiber on a dry substance basis.

Various known centrifugal screening devices capable of continuously separating solids and liquids can be employed in the process of the invention. Generally, such devices comprise a cylindrical screen, means for imparting centrifugal force to a slurry, and means for removing separated solids from the screen. In a large volume industrial process, commercially available centrifugal paddle screens, such as vertical or horizontal rotary sifters, are most suitable.

Centrifugal paddle screens are fitted with paddles (or beater bars) which are affixed to a rotor. The paddles rotate at a fixed distance from a screen which is disposed in circumferential relation to the rotor. The fixed distance is referred to as the clearance or gap between the paddles and the screen. Rotation of the paddles causes the material entering the centrifugal paddle screen to be thrown against the screen. Means are also provided (such as a vane at the inlet) to move material down the screen from the inlet to the outlet.

When wet material, such as the overflow from the hydroclone in the present invention, enters a centrifugal paddle screen the paddles throw the wet material against the screen. Water flushes off quickly. The paddles continue to throw the remaining material against the screen as the material works its way down the length of the screen to the outlet.

In the present invention, the separated liquid which passes through the screen contains fine fiber, starch and protein which were separated from the more coarse fiber. This is combined with the underflow from the hydroclone and returned to the corn wet-milling process as noted above. The separated solid is a coarse hull fiber which contains from about 65 to about 80% water.

The operation of the paddle screen is optimized by adjusting three parameters. One parameter is the screen openings. If they are too small, too much starch and protein will remain with the coarse hull fiber. If they are too large, too much fiber will be lost with the separated liquid. Another parameter is the distance between the screen and the paddles. If it is too large, the material will not be subject to sufficient grinding action (scrubbing) to separate starch and protein from the coarse hull fiber. The centrifugal paddle screen will essentially perform only a dewatering function. If it is too small, the centrifugal paddle screen will choke-up; it will not operate effectively. The third parameter is the operating speed of the paddle screen. The objective of optimizing the parameters, is to minimize loss of fiber while enhancing scrubbing to remove starch and protein from the fiber.

A preferred paddle screen for the process of the invention is the Indiana Canning Machine No. 77, which is a horizontal rotary sifter obtained from the Indiana Canning Machine Company, Indianapolis, Indiana. The general use of such machines to separate starch and fiber is described in U.S. Pat. No. 3,813,298. For use in this stage of the present invention, it is fitted with a screen having openings between about 2 mm and about 4 mm, preferably about 3 mm in diameter and the clearance between the screen and the paddles is set between about 6 mm and about 15 10 mm, preferably between about 7 mm and about 11 mm. Operating speeds can be between about 500 and about 2200 revolutions per minute (rpm) with speeds from about 500 to about 1500 rpm being preferred.

The coarse hull fiber from the first centrifugal paddle screen is washed in two stages. In the first stage, it is preferable to use a washing station comprised of one or more wash tanks. The washing station can be operated in a continuous or batchwise fashion, with continuous operation giving the most effective results. Washing in the tank or tanks removes free starch, gluten, off flavors, SO$_2$ and other forms of contamination from the fiber.

In a preferred embodiment, the coarse hull fiber is added with water to a first wash tank which is provided with a stirrer. The water is optionally heated to enhance dissolution of SO$_2$. The wet fiber exiting the first wash tank is then pumped to a second stirred wash tank. This tank is particularly useful for further removal of SO$_2$.

Wash water can be treated to reduce SO$_2$ content prior to washing, and/or the treatment can be conducted following washing if the wash water is to be recycled. If such treatment is desired, a steam stripper can be used to boil off the SO$_2$.

Residence times in the wash tank or tanks are selected to optimize removal of contaminants. With respect to SO₂, for example, the optimum residence time is the time required for the concentration of $SO_2$ in the fiber to approximately equal the $SO_2$ concentration in the wash water. Throughput rates are selected to approach the optimum residence time. With the two tank wash system 15 described above, the combined residence time of fiber in the wash tanks is from about 5 to about 30 minutes, with from about 10 to about 20 minutes being preferred. Longer times can be used, but do not provide a meaningful improvement in results.

When heated water is used, the residence times can be shorter and $SO_2$ removal is enhanced. Water temperatures between about 150 and 210° F. can be used, with the most effective temperatures being above about 170° F. The preferred range is from about 170 to about 205° F. Temperatures below about 150° F. are ineffective to enhance removal of $SO_2$. Temperatures exceeding about 205° F. may result in undesirable odors.

The wet fiber exiting the second wash tank is pumped into a second centrifugal paddle screen for the second washing stage. This stage removes more of the contaminants along with most of the water from the wet fiber.

The second centrifugal paddle screen is set up in the same way as the first centrifugal paddle screen. Operation of this paddle screen is also optimized on the basis of the same criteria as the first centrifugal paddle screen.

A preferred paddle screen for this stage of the process is also the Indiana Canning Machine No. 77. For use in this stage, it is fitted with a screen having openings between about 2mm and about 4 mm, preferably about 3 mm in diameter and the clearance between the screen and the paddles is set between about 6 mm and about 15 mm, and preferably between about 7 mm and 11 mm. Operating speeds can be from about 500 to about 2200 rpm. Preferred operating speeds are between about 500 and 1500 rpm.

The separated liquid which passes through the screen may be combined with the underflow from the hydroclone and returned to the corn wet milling process as noted above. The separated solid contains about 65 to 80% water and has a high total dietary fiber content. This material is then dried or, optionally, pressed followed by drying. Pressing the material removes water and, consequently, reduces the $SO_2$ content in the dried product.

Various commercial presses can be used for pressing the separated solid taken from the second centrifugal paddle screen. Examples of suitable presses include screw presses and belt presses. One press which has been used in some of the experimental work on the present invention is the Bauer Heli press twin screw press which is available from ABB Bauer, P.O. Box 968, Springfield, Ohio 45501 U.S.A. Another press which can be used is the Vetter Dewatering Screw Press which is available from Dedert Corporation, Olympia Field, Illinois U.S.A. This is a single screw press. Both presses are capable of reducing moisture content in the separated solid material to about 5 to 60% by weight.

Separated liquid from the press may be combined with the underflow from the hydroclone and returned to the corn wet-milling process as noted above. Solid material from the press is then dried.

The material entering the dryer can be taken from the outflow of the second centrifugal paddle screen or the press. Drying can be carried out on various types of continuous or batchwise dryers which are well-known items of commerce. Particularly suitable dryers for continuous operation include pneumatic transport dryers, flash dryers, rotary steam tube dryers and the like.

When a flash dryer is used, about 90 to about 95% of the material entering the flash dryer is recycled to give sufficient residence time to dry the material. Inlet air temperatures (dry bulb) of from about 300 to about 1,000° F., preferably from about 350 to about 450° F. and exit air temperatures (dry bulb) from about 220 to about 300° F., preferably from about 225 to about 260° F. are used. The average residence time is from about 3 to about 8 minutes and preferably from about 5 to about 6 minutes.

Dried material, which has a moisture content of from about 2 to about 10% by weight, may be ground to any desired size depending on the end use of the product.

The high total dietary fiber product obtained by this process 15 has a light color and a bland taste. It is suitable for use in a variety of food products. Thus, a continuous process has been developed, which can be used for large-scale production of a food-grade fiber having a high total dietary fiber content and which is prepared from a readily available starting material.

The following examples further illustrate the present invention and will enable others skilled in the art to understand it more completely. It should be understood, however, that the invention is not limited solely to the examples given below. In the examples, all percentages given are on a weight basis unless otherwise indicated. The total dietary fiber values were determined by the method of Prosky, et al, *J. Assoc. Off. Anal. Chem.*, 67, 1044–1051 (1984). They represent the material remaining after the removal of starch, protein, fat, and ash from a given sample.

EXAMPLE 1

Separate portions of a 10-20% solids fiber stream, obtained during wet-milling of corn, were used in the runs described in this example. The fiber stream was diluted with water to give a slurry with a solids concentration of about 2.25% by weight. The dilute aqueous slurry of crude corn fiber was then passed through a 6-inch (15.24-cm) diameter hydroclone (DorrClone, Dorr-Oliver Company) at a supply rate of about 190 liters per minute. The pressure drop across the hydroclone was 8 psi (0.56 kg/cm²). The volume ratio of the overflow stream to the supply stream was 0.71. The overflow stream was then pumped through a centrifugal paddle screen (Indiana Canning Machine Company, Model No. 77), fitted with a screen having 3.2 mm diameter openings and with a 9.5 mm gap between the paddles and the screen. The machine was operated at a speed of 600 rpm. The dietary fiber which was discharged from the paddle screen was washed, dried, and analyzed. The results of two runs are given in Table 1. They demonstrate that when the crude fiber stream from the corn wet-milling process is subjected to the process of this invention, a dietary fiber fraction is obtained which has a dietary fiber content greater than 90%.

TABLE I

|  | Yield (% of Original TDF) | TDF[a] (% d.b.[b]) | Starch (% d.b.) | Protein (% d.b.) | Fat (% d.b.) |
|---|---|---|---|---|---|
| Starting Material |  | 46.9 | 30.1 | 16.0 | 1.8 |
| Product |  |  |  |  |  |
| Run 1 | 6.5 | 91.4 | 4.8 | 5.1 | 1.8 |

TABLE I-continued

| Run | Yield (% of Original TDF) | TDF[a] (% d.b.[b]) | Starch (% d.b.) | Protein (% d.b.) | Fat (% d.b.) |
|---|---|---|---|---|---|
| Run 2 | 4.4 | 92.5 | 5.7 | 5.0 | 2.1 |

[a]TDF = Total Dietary Fiber
[b]d.b. = dry basis

EXAMPLE 2

The general procedure of Example 1 was followed except that the water used for dilution of the crude fiber was process water from the corn wet-milling process. In Runs 3, 4, and 5, the gap between the paddles and the screen in the paddle-screen apparatus was changed to show the influence of this gap on the quality of the product. In Runs 6-11, the dietary fiber slurry washed from the screen of the first paddle screen was passed into a second paddle screen before the product was isolated. The results of these runs are given in Table II. Runs 3-5 demonstrate that as the gap between the paddle and the screen is reduced, the percentage of total dietary fiber inn the product increases. Runs 7-11, which all employed a gap between the paddle and the screen like that of Run 4, demonstrate that passage of the dietary fiber through a second paddle screen gives a product with a somewhat higher dietary fiber content than does the process using the same conditions which includes only one pass through a paddle screen.

TABLE II

| Run | Yield (% of Original TDF[a]) | TDF (% d.b.[b]) |
|---|---|---|
| 3[c] | — | 89.5 |
| 4 | 5.6 | 91.1 |
| 5[c] | 4.7 | 94.4 |
| 6 | — | 93.4[d] |
| 7 | 4.0 | 93.8 |
| 8 | 5.0 | 93.1 |
| 9 | 7.0 | 92.8 |
| 10 | 5.2 | 92.2 |
| 11 | 7.8 | 92.1 |

[a]TDF = Total Dietary Fiber
[b]d.b. = dry basis
[c]In runs 3 and 5, the gap between the paddles and screen was 13 mm and 6.4 mm, respectively. In all other runs, the gap was 9.5 mm.
[d]Average of five batch washes. Runs 7-11 were washed continuously on a second paddle screen.

EXAMPLE 3

A crude corn fiber stream as in Example 1 was diluted with water to give a slurry with a solids concentration of about 2% by weight. The dilute aqueous slurry of crude corn fiber was then passed through the hydroclone as in Example 1. In the various runs, the pressure drop across the hydroclone was between 0.7 and 0.9 kg/cm$^2$. The volume ratio of the overflow stream to the supply The volume ratio of the overflow stream to the supply stream was about 0.65. The results of four runs are given in Table III.

TABLE III

| Run | Yield (% of Original TDF[a]) | TDF (% d.b.[b]) |
|---|---|---|
| 12 | 6.5 | 85.6 |
| 13 | 9.4 | 81.7 |
| 14 | 6.6 | 84.1 |
| 15 | 3.6 | 84.3 |

[a]TDF = Total Dietary Fiber
[b]d.b. = dry basis

EXAMPLE 4

This example summarizes several runs to provide information on the results achieved for a range of parameters. The general procedure of Example 1 was followed to obtain coarse hull fiber from the first centrifugal paddle screen.

Coarse hull fiber having 70% moisture was taken from the outflow of the first centrifugal paddle screen and dropped by gravity through an 8 inch spout into a 100 gallon stirred tank. One to three gallons/minute of flush water was added at the discharge of the paddle screen to prevent a buildup of product in the spout. The fiber at this stage is past the basic separation stage, and ready for washing to remove any remaining free starch, gluten, off flavors, $SO_2$, and any other forms of contamination, which are typically associated with material which is normally destined to become feed. This fiber has from about 250 to about 450 parts per million (ppm) $SO_2$ based on total weight, including water.

The 100 gallon tank was used as a collection vessel for fiber, fresh water and water recycled from the filtrate stream of the second centrifugal paddle screen. Dry substance concentration in the tank was about 0.5 to 1.5 ounces/gallon. The use of recycled water allowed a higher volume of water to be pumped out of the tanks, while holding down the amount of fresh water used in the process. In effect, water was pumped around the wash station at about three times the rate of the use of fresh water, which was metered in and out of this station.

About 20 gallons/minute fresh water was metered into the wash tank. The fresh water was heated with a hydroheater to about 184° F. by direct contact with steam. Temperature in the 100 gallon tank was about 175° F.

The hot fiber from this tank was pumped at 60 gallons/minute to a second 800 gallon stirred tank. This tank was used to increase the average time the fiber was in contact with the wash water, further reducing the $SO_2$ content. Between the two tanks, the average residence time was 14 minutes. The contents of the second tank were pumped at 60 gallons/minute to the second centrifugal paddle screen.

The second centrifugal paddle screen was fitted with a screen having 3 mm diameter openings and with a 9 mm gap between the paddles and the screen. The machine was run at 1100 rpm to improve dewatering.

The filtrate from the second centrifugal paddle screen was split between the recycle back to the 100 gallon wash tank and an exit stream equal to the amount of fresh water entering the 100 gallon tank. This exit stream was either sent to the crude mixed fiber stream dilution tank or was combined with the underflow from the hydroclone and returned to the corn wet-milling process.

The fiber exiting the second centrifugal paddle screen flowed at a rate from about 8-12 pounds/minute at 70-75% moisture. The total dietary fiber was about 92 to 94% dry basis, and $SO_2$ concentration was from 20-50 ppm based on total weight, including water. From here the fiber was flushed, with 1 to 3 gallons/minute of cold fresh water, down a 100 foot long pipe to a twin screw Bauer Heli press.

The press was used to reduce moisture content of the fiber to about 52-54%. About one half of the water remaining in the fiber taken from the second centrifugal paddle screen, along with about one half of the remaining $SO_2$ and some remaining starch was removed as filtrate. This resulted in the removal of about one half of the total $SO_2$ remaining in the wet fiber after washing.

The concentration of $SO_2$ in the fiber leaving the press was from about 20-50 ppm based on total weight, including water.

The fiber from the press was dried in a pneumatic transport dryer at an exit air temperature (dry bulb) of about 260° F. for a residence time of from about 5 to about 6 minutes. Dried fiber having a moisture content of about 5% was supplied to a Bauermeister Asima mill (available from Bauermeister, 4127 Willow Lake Boulevard, Memphis, Tennessee 38118 U.S.A.), which ground the fiber to about −100 Mesh. From here, the fiber was bagged and palletized.

It should be noted that other types of milling equipment can be used in accordance with the invention. For example, the Prater Model CLM 100 mill or other Prater products can be used such as the Rema Aerosplit or MAC 3 (which are attrition mills with air classifiers). These are available from Prater at 1515 South 55th Court, Chicago, Illinois 60650 U.S.A.

EXAMPLE 5

As with Example 4, this example summarizes several runs under various test conditions. The results are summarized in Tables IV-VI. The general procedure of Example 1 was followed to produce coarse hull fiber.

Table IV provides a comparison of dietary fiber made in accordance with Example 1 and dietary fiber made in accordance with a modified Example 4 process. In the modified Example 4 process, all of the process steps and conditions were followed except that the fresh water was not heated with a hydroheater, the second 800 gallon tank was not used, and the Bauer press was not used. Residence time in the 100 gallon wash tank averaged about 2 minutes. In the Table, the term "% d.b. TDF" means "% dry basis total dietary fiber".

TABLE IV

| Run No. | Example 1 % d.b. TDF(a) | Modified Example 4 % d.b. TDF(b) |
|---|---|---|
| 1 | 89.9 | |
| 2 | 90.5 | |
| 3 | 90.9 | |
| 4 | | 93.1 |
| 5 | | 92.4 |
| 6 | | 94.1 |

(a)Laboratory wash to remove any free starch and/or protein
(b)Dried, but not ground The fiber from all of the runs was dried in a pneumatic transport dryer to a moisture content of from about 3 to about 5%. The fiber was ground to −100 mesh. When the ground product was measured for total dietary fiber content, it was found that such content had been reduced by about 1 to 2%

Table V illustrates the effects of certain process conditions on $SO_2$ content. The process of Example 4 was followed except that the fresh water was not heated for runs 1-3. For runs 4-7, the hydroheater was used to heat the fresh water and a heated steam jacket was provided around the 800 gallon wash tank. Average combined residence time in the two wash tanks was about 14 minutes. All $SO_2$ measurements in ppm are based on total weight, including water. The temperatures indicated for runs 4-7 refer to the water temperature in the 800 gallon wash tank. Inn run 6, the sample was taken 2 hours after the temperature reading. The wash water rate for all of the samples was about 10 gallons water per pound of dry substance DS), or about 20 gallons/minute.

TABLE V

| Run | Fiber supply $SO_2$ ppm | Wash water $SO_2$ ppm | Finished product $SO_2$ ppm | D.S.concen. ounces/gal. |
|---|---|---|---|---|
| 1 | 690 | 4 | 150 | — |
| 2 | 600 | 10 | 130 | — |
| 3 | 440 | 20 | 150 | — |
| 4 (145° F.) | 420 | 30 | 60 | — |
| 5 (205° F.) | 350 | 25 | 35 | .78 |
| 6 (190° F.) | 325 | 20 | 65 | .30 |
| 7 (204° F.) | 455 | 30 | 55 | .87 |

Table VI illustrates the effects of the pressing step on $SO_2$ content. The process of Example 4 was followed. A press was not used in runs 1-3, but a twin screw Bauer press was used in runs 4-5. Wash water temperature in the 800 gallon tank was maintained at about 180° F.

TABLE VI

| Run | Fiber from second centrifugal paddle screen ppm $SO_2$ (75% moisture) | Pressed Fiber ppm $SO_2$ (52% moisture) | Finished Product ppm $SO_2$ (3.5% moisture) |
|---|---|---|---|
| 1 | 35 | | 70 |
| 2(1) | 22 | | 52 |
| 3(1) | 21 | | 48 |
| 4 | 25 | 25 | 35 |
| 5(1) | 25 | 15 | 35 |

(1)Wash tanks were operated batchwise. They were operated on a continuous basis for runs 1 and 4.

After two or more weeks storage of the finished product, $SO_2$ content was measured again. We found that we had a 50-66% reduction in $SO_2$ concentration. The reduction is particularly apparent in product produced using wash water at a temperature from about 190-200° F. in the 800 gallon tank.

Thus, it is apparent that there has been provided, in accordance with the invention, a process for producing a high total dietary corn fiber that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and scope of the appended claims.

What is claimed is:

1. A continuous process for producing a corn fiber product having a high dietary fiber content which comprises:

a) diluting crude fiber obtained from the corn wet-milling process with water to prepare an aqueous slurry of crude corn fiber having a solids concentration of from about 2% to about 5% by weight;
b) passing said aqueous slurry of crude corn fiber through a hydroclone wherein the operating pressure of the hydroclone is adjusted to optimize recovery of fiber from the overflow stream from the hydroclone;
c) passing said overflow stream from the hydroclone into a first centrifugal paddle screen which is operated at an effective operating speed and has screen openings which are sized to maximize the amount of starch and protein which passes through the screen and minimize loss of fiber, and the clearance between the screen and the paddles is selected to optimize scrubbing the fiber to remove starch and protein; and
d) washing the solid separated by the first centrifugal paddle screen in two washing stages wherein the first washing stage includes diluting said solid with water and the second washing stage includes passing the solid material taken from the first washing stage through a second centrifugal paddle screen.

2. The process of claim 1 wherein a wash tank system is used in the first washing stage.

3. The process of claim 2 wherein the operating pressure of the hydroclone is adjusted so that from about 65% to about 75% of the volume of the aqueous slurry entering the hydroclone exits in the overflow stream from the hydroclone.

4. The process of claim 3 wherein the operating pressure of the hydroclone is adjusted so that the pressure drop across the hydroclone is from about 0.56 kg/cm$^2$ and about 0.9 kg/cm$^2$.

5. The process of claim 1 wherein the first centrifugal paddle screen has screen openings with a diameter of from about 2 mm to about 4 mm and the clearance between the screen and the paddles is from about 6 mm to about 15 mm.

6. The process of claim 5 wherein the screen openings have a diameter of about 3 mm and the clearance between the screen and the paddles is from about 7 mm to about 11 mm.

7. The process of claim 5 wherein the first centrifugal paddle screen is operated at a speed of from about 500 to about 2200 revolutions per minute.

8. The process of claim 2 wherein the wash tank system comprises a first wash tank and a second wash tank.

9. The process of claim 8 wherein the material in the first wash tank is maintained at a temperature of from about 150° F. to about 210° F.

10. The process of claim 8 wherein the material in the second wash tank is maintained at a temperature of from about 150° F. to about 210° F.

11. The process of claim 8 wherein the material in both wash tanks is maintained at a temperature of from about 170° F. to about 205° F.

12. The process of claim 2 wherein the water used in the wash tank system is boiled prior to use to remove SO$_2$.

13. The process of claim 2 wherein the residence time of the solid separated by the first centrifugal paddle screen in the wash tank system is from about 5 to about 30 minutes.

14. The process of claim 13 wherein the residence time is from about 10 to about 20 minutes.

15. The process of claim 1 wherein the second centrifugal paddle screen has screen openings which are sized to maximize the amount of starch and protein which passes through the screen and minimize loss of fiber, and the clearance between the screen and the paddles is selected to optimize scrubbing the fiber to remove starch and protein.

16. The process of claim 15 wherein the screen openings have a diameter of from about 2 mm to about 4 mm and the clearance between the screen and the paddles is from about 6 mm to about 15 mm.

17. The process of claim 15 wherein the screen openings have a diameter of about 3 mm and the clearance between the screen and the paddles is from about 7 mm to about 11 mm.

18. The process of claim 16 wherein the second centrifugal paddle screen is operated at a speed of from about 500 to about 2200 revolutions per minute.

19. The process of claim 1 wherein said corn fiber product is dried to a moisture content of from about 2% to about 10%.

20. The process of claim 1 wherein said corn fiber product is pressed to reduce the moisture content to from about 50% to about 60%.

21. The process of claim 20 further comprising the step of drying the pressed material to a moisture content of from about 2% to about 10%.

22. A continuous process for producing a corn fiber product having a high dietary fiber content which comprises:
a) diluting crude fiber obtained from the corn wet-milling process with water to prepare an aqueous slurry of crude corn fiber having a solids concentration of from about 2% to about 5% by weight;
b) passing said aqueous slurry of crude corn fiber through a hydroclone wherein the operating pressure of the hydroclone is adjusted so that from about 65% to about 75% of the volume of the aqueous slurry entering the hydroclone exits in the overflow stream from the hydroclone;
c) passing said overflow stream from the hydroclone into a first centrifugal paddle screen operated at a speed from about 500 to about 1500 revolutions per minute and having screen openings with a diameter of from about 2 mm to about 4 mm and a clearance between the screen and the paddles of from about 6 mm to about 15 mm; and
d) washing the solid separated by the first centrifugal paddle screen in two washing stages wherein a wash tank system is used in the first washing stage and second centrifugal paddle screen is used in the second washing stage.

* * * * *